(12) United States Patent
Antopolsky et al.

(10) Patent No.: US 9,887,987 B2
(45) Date of Patent: Feb. 6, 2018

(54) SMARTPHONE AND COMPUTER APPLICATION FOR PERSONAL MEETINGS DOCUMENTATION THAT ENABLES ACCESS TO THE DOCUMENTATION FILE ONLY BY THE PARTICIPANTS

(71) Applicants: Eliahu Antopolsky, Zichron Yakov (IL); Yacov Gottman, Karkur (IL)

(72) Inventors: Eliahu Antopolsky, Zichron Yakov (IL); Yacov Gottman, Karkur (IL)

(*) Notice: Subject to any disclaimer, the term of this patent is extended or adjusted under 35 U.S.C. 154(b) by 0 days.

(21) Appl. No.: 14/785,483

(22) PCT Filed: Aug. 11, 2014

(86) PCT No.: PCT/IL2014/000037
§ 371 (c)(1),
(2) Date: Oct. 19, 2015

(87) PCT Pub. No.: WO2015/025308
PCT Pub. Date: Feb. 26, 2015

(65) Prior Publication Data
US 2016/0156612 A1 Jun. 2, 2016

(30) Foreign Application Priority Data
Aug. 22, 2013 (IL) .......................... 228082

(51) Int. Cl.
*H04M 1/66* (2006.01)
*H04L 29/06* (2006.01)
*H04W 4/20* (2009.01)

(52) U.S. Cl.
CPC .......... *H04L 63/083* (2013.01); *H04L 63/065* (2013.01); *H04W 4/206* (2013.01)

(58) Field of Classification Search
CPC ..... H04L 65/403; H04L 63/08; H04L 63/104; H04L 65/607; H04L 63/0428; H04L 63/10; H04L 12/1818; H04L 12/1822; H04N 7/15; H04N 7/147; H04N 7/155; H04N 21/4223; G06Q 10/1095; H04M 3/56
USPC ............................................... 455/414.1–417
See application file for complete search history.

(56) References Cited

U.S. PATENT DOCUMENTS

| | | | |
|---|---|---|---|
| 2010/0189260 A1* | 7/2010 | Ramanathan | G06F 21/10 380/259 |
| 2011/0182420 A1* | 7/2011 | Kramarz von Kohout | H04M 3/2218 380/28 |

* cited by examiner

*Primary Examiner* — Ronald Eisner

(57) ABSTRACT

An application that enables documentation of meetings using a Smartphone or internet-based communication programs installed on a computer whereby the application enables each of the participants in the personal meeting to input a personal identification code designed to serve as a personal key. The application enables the user to document the personal meeting using the audio and video recording means of the Smartphone or the computer's internet-based communications programs and to save the documentation as a documentation file that may be opened only using all of the personal keys simultaneously.

3 Claims, 1 Drawing Sheet

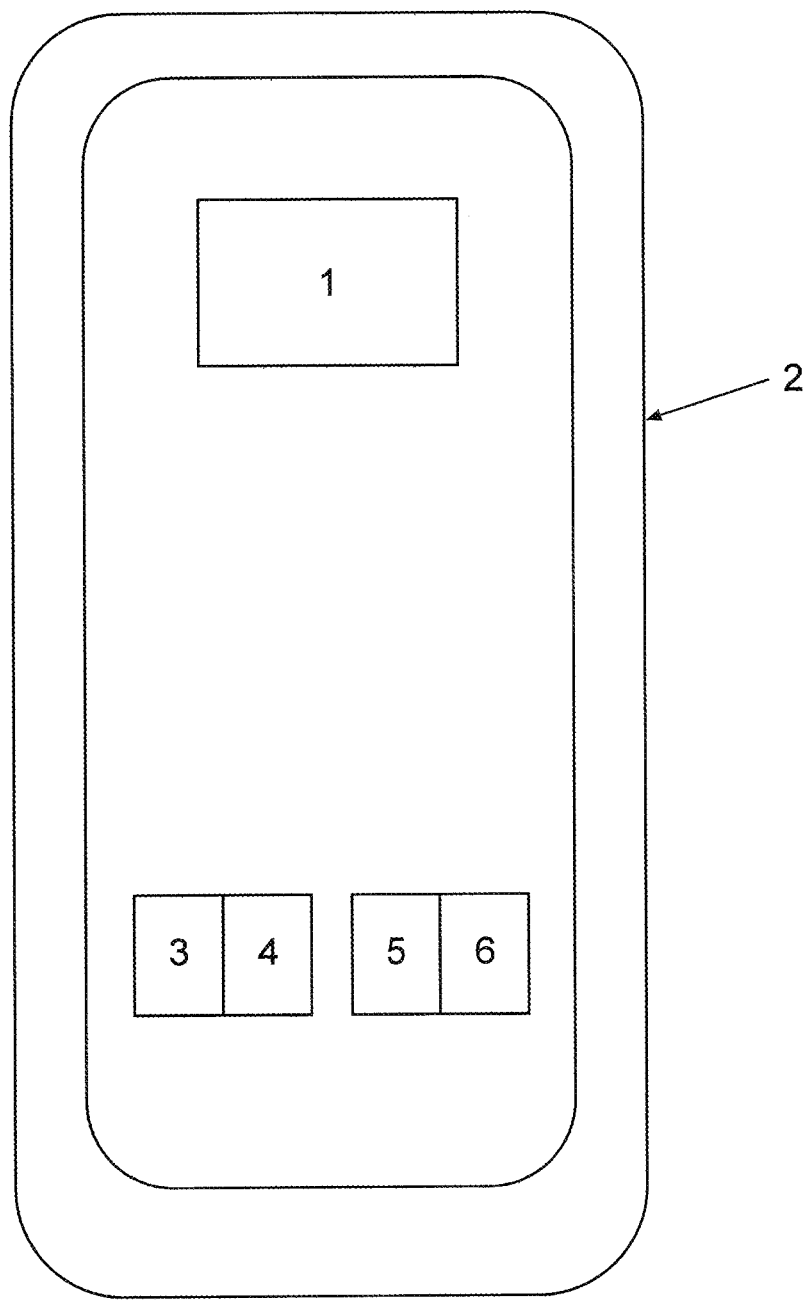

SMARTPHONE AND COMPUTER APPLICATION FOR PERSONAL MEETINGS DOCUMENTATION THAT ENABLES ACCESS TO THE DOCUMENTATION FILE ONLY BY THE PARTICIPANTS

RELATED APPLICATIONS

This application is a National Phase of PCT Patent Application No. PCT/IL2014/000037 having International filing date of 11 Aug. 2014, which claims the benefit of priority of IL Patent Application No. 228082 filed on 22 Aug. 2013. The contents of the above applications are all incorporated by reference as if fully set forth herein in their entirety.

FIELD OF THE INVENTION

The present invention relates to a Smartphone and computer application for personal meetings documentation which enables an access to the documentation file only by the consent of all the participants

BACKGROUND OF THE INVENTION

In many cases disputes arise as to the nature and the content of meetings that were held in the past, mainly when such meetings were not recorded and were between two persons in private. Experience of life teaches us that in many such cases one participant alleges ex post facto that during the meeting certain events happened or certain spoken words were told and on the other hand the other participant alleged differently. Indeed, almost any Smartphone or computer can be used for meeting documentation which includes audio and video recording.

However, using a Smartphone or computer for documenting a meeting is not sufficient in special cases, when the participants are interested in recording the meeting using the Smartphone or computer and at the same time they are also interested in the safety of documentation, in the meaning that no one—even one of the participant—would have an access to the documentation without specific consent of all the participant of that meeting. Such kind of meeting can be for example: meetings between psychologist or psychiatric and patient.

In such meetings the patient discloses personal and intimate information that he does not want this information would be disclosed to others; meetings between attorney and his client when they discuss sensitive matters; meetings for medical treatment such as dental, physiotherapy and other kinds of medical treatment; Sexual meetings between two persons where the position of authority at work exists between them, and other kind of relationship, where there is a concern that in the future one participant may claim that he had sex without consent or that the nature of the relationship was colored with semi criminal or immoral aspects. The expression "personal meeting" in this patent application relates to all of those kind of meetings.

The present invention offers a solution for people who wish to document a personal meeting using their smartphone or their computer using internet-based communication programs such as SKYPE® or MESSENGER® in a way that will prevent any access the documentation unless such access is authorized by all of the meeting's participants and by the positive action of each and every one of the participants. The Smartphone and computer application, subject matter of the present invention, enables each participant to receive or to dictate a personal key such that access to the documentation is possible only when all of the personal keys are used at once. Thus, for instance, the said Smartphone or computer application may be used by a psychologist and his patient, or by a lawyer and her client, or by a pair of lovers who wish to document their meeting using their Smartphone or personal computer using internet-based communication programs such as SKYPE® or MESSENGER® but do not want the other to be able to access the information in the future without both participants consenting to such access. The present Smartphone and computer application, subject of the present patent application, offers an excellent solution to this problem.

LIST OF DRAWINGS

The intention of the drawing attached to the application is not to limit the scope of the invention and its application. The drawing is intended only to illustrate the invention and it constitute only one of its many possible implementations.

FIG. 1 describes schematically the smartphone application (1), a smartphone (2), an audio recording means (3), a video recording means (4), a personal identification code (5) and a documentation file (6).

THE INVENTION

The main object of the present invention is to provide a Smartphone or computer application that enables the user to record personal meetings between two persons or more using their Smartphone or internet-based communication programs so that before beginning the documentation each participant creates a personal means of identification (hereinafter the "personal key") in the application, without which it will later be impossible to open the file containing to the audio or video documentation using the Smartphone, the computer or an internet-based communication program, using the application.

The application, subject of the present invention, enables each of the participants/users to perform the following operations: (a) open the application on their Smartphone or personal computer and login to the internet-based communication program using the application; (b) create a personal identification means that serves as a "personal key"; (c) document the meeting using the Smartphone and the Smartphone's camera and microphone or, in the case of internet-based communications programs, to document the meeting using the means installed on the personal computer; (d) save the documentation file in the Smartphone or computer; (e) open the documentation file only when to all of the participants consent to use their personal keys to open the documentation file.

Opening the documentation file and accessing the documentation can be done only by the consent of all the parties of the meeting and only after they use their personal keys. Each participant in the personal meeting creates one personal key and without this personal key it is impossible to open the documentation file. Thus each participant of the personal meeting knows that there is no risk in documenting the personal meetings due to the fact that the documentation file is inaccessible to any person without his or her consent and without using the personal key that he possesses.

The way of using the Smartphone or computer application: anyone who plans to have a personal meeting, or series of such meetings, can download the application to his Smartphone or computer and can use it to document those meetings. Each participant creates a personal key, and therefore only the participants together and with their own consent can open the documentation file.

If after the meeting one of the participants alleged that during the meeting something wrong had happened, or in any other case of disagreeing as to the nature of the meeting, the participants can together open the documentation file, reveal the information, and resolve the dispute.

The personal key: as mentioned above, the application enables each participant to have a personal key. The personal key can be a serial of digits, numbers or letters that the user inputs via the keyboard of the Smartphone or the computer, in the same way a code is created for the internet or a computer. It is clearly understood that the participant may choose the code at his discretion. It also goes without saying that each participant should keep his own private code in confidence. The personal key can be also a biometric key, for example, a finger print if the Smartphone or computer offers this option; or a retina-scanning code, such that each participant scans his or her retina and the unique structure of the retina serves as the person's own personal key, a voice identification or Identification by facial features.

The personal key can, as mentioned, be a code that contains numerals and letters that the user inputs using the Smartphone's or computer's keyboard or a voice recognition code that is recorded by the Smartphone or computer, or some kind of personal magnetic card, like a magnetic medical card, a credit card, or a driver's license, or it can be a Disk-on-Key that contains some kind of identification, and so on.

The application, subject of the present patent application, operates on a Smartphone or computer without the need for a server. The application can also include the following elements:

Several Smartphones may be synchronized to simultaneously document the personal meeting whereby each of the Smartphones saves the documentation done by all of the other Smartphones. In such case the communication between the synchronized Smartphones can be cellular, via BLUETOOTH®, Wi-Fi, etc. This element enables panoramic documentation of the event from several photographic perspectives rather than from only one.

The application may also be used to document meetings held via communication programs such as SKYPE®, MESSENGER®, etc. (referred to here as internet-based communications programs) such that each participant downloads the application to his or her computer, and uses it to open the internet-based communications program and have the personal meeting. The documentation of the meeting is then saved in a documentation file that may be opened only if all of the personal keys of all of the participants are used simultaneously.

The application may also be used for photo or video camera in case the parties prefer that the photos or the video will be inaccessible unless the parties will use their personal keys. In such case the application can works even without internet connection. In addition, the documentation can be saved on a server—cloud—and be inaccessible unless the parties will use their personal keys.

FIG. 1 describes schematically the smartphone application (1), the smartphone (2), the audio recording means (3), the video recording means (4), the personal identification code (5) and the documentation file (6).

The invention claimed is:

1. An application, stored in a smartphone device, that enables documentation of meetings using the smartphone's audio or video recorder, or using a photo or a video camera the application performing the steps of:
   receiving, from each participant in a face-to-face personal meeting, a personal identification code, the personal identification code acting as a personal key;
   creating, upon receiving the personal identification code, using the smartphone's audio and video recording means, or a photo or a video camera, documentation of the face-to-face personal meeting;
   saving the documentation of the face-to-face personal meeting as a documentation file; and
   opening, only if all participants' personal identification codes are used simultaneously, the documentation file.

2. The application, stored in a smartphone device according to claim 1, performing the step of creating documentation of the face-to-face personal meeting using two or more smartphones wherein each smartphone can save the documentation made by all of the other smartphones used for documentation of the said meeting.

3. A computer program stored in a smartphone device, the computer program enabling a user to document a face-to-face personal meeting, the computer program performing the steps of:
   receiving, from each participant in a face-to-face personal meeting, a personal identification code, the personal identification code acting as a personal key;
   creating, upon receiving the personal identification code, using the smartphone's audio and video recording means, or a photo or a video camera, documentation of the face-to-face personal meeting;
   saving the documentation of the face-to-face personal meeting as a documentation file; and
   opening, only if all participants' personal identification codes are used simultaneously, the documentation file.

* * * * *